United States Patent
Naito

(10) Patent No.: US 10,249,918 B2
(45) Date of Patent: Apr. 2, 2019

(54) BATTERY PACKS FOR ELECTRIC TOOLS

(71) Applicant: MAKITA CORPORATION, Anjo-shi, Aichi (JP)

(72) Inventor: Akira Naito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 166 days.

(21) Appl. No.: 14/589,311

(22) Filed: Jan. 5, 2015

(65) Prior Publication Data

US 2015/0194710 A1    Jul. 9, 2015

(30) Foreign Application Priority Data

Jan. 9, 2014   (JP) ................. 2014-002225

(51) Int. Cl.
*H01M 10/48* (2006.01)
*H01M 2/10* (2006.01)

(52) U.S. Cl.
CPC ....... *H01M 10/486* (2013.01); *H01M 2/1055* (2013.01); *H01M 10/482* (2013.01); *H01M 2200/10* (2013.01); *H01M 2220/30* (2013.01)

(58) Field of Classification Search
CPC ............. H01M 10/486; H01M 10/425; H01M 10/482; H01M 10/48; H01M 2010/4271;
(Continued)

(56) References Cited

U.S. PATENT DOCUMENTS

2009/0041082 A1* 2/2009 Paramasivam .... G01R 31/3675
374/152
2009/0117452 A1 5/2009 Wiesner et al.
(Continued)

FOREIGN PATENT DOCUMENTS

JP   2008-80420 A    4/2008
JP   2012-221854 A   11/2012
(Continued)

OTHER PUBLICATIONS

Aug. 10, 2017 Office Action issued in German Patent Application No. 10 2015 000 142.6.
(Continued)

*Primary Examiner* — Stephen J Yanchuk
(74) *Attorney, Agent, or Firm* — Oliff PLC

(57) ABSTRACT

A battery pack includes a case, a battery device, an intervening member and a temperature detection device. The battery device may be disposed within the case and include a cell holder configured to accommodate a plurality of battery cells. The intervening member may be provided between the cell holder and at least one of the plurality of cell holder. The temperature detection device may be disposed between the intervening member and at least one of the plurality of cell holder, so that the temperature detection device directly contacts at least one of the battery cells for detecting a temperature thereof. At least one of the cell holder and the intervening member may have an elasticity, so that the temperature detection device may be directly pressed against at least one of the battery cells due to an elastic deformation of the least one of the cell holder and the intervening member.

22 Claims, 14 Drawing Sheets

(58) Field of Classification Search
CPC ......... H01M 2220/10; H01M 2220/30; H01M 2/1055
See application file for complete search history.

(56) References Cited

U.S. PATENT DOCUMENTS

| | | |
|---|---|---|
| 2009/0286143 A1 | 11/2009 | Matthias et al. |
| 2012/0129013 A1 | 5/2012 | Lee |
| 2013/0108904 A1 | 5/2013 | Okabayashi |
| 2013/0288091 A1* | 10/2013 | Tsubaki ................... G01K 1/14 |
| | | 429/90 |
| 2014/0227570 A1* | 8/2014 | Hoshi ................ H01M 2/1077 |
| | | 429/90 |

FOREIGN PATENT DOCUMENTS

| | | |
|---|---|---|
| JP | 2013-045519 A | 3/2013 |
| JP | A-2013-097901 | 5/2013 |
| WO | WO 2012/157464 | * 11/2012 |

OTHER PUBLICATIONS

May 23, 2017 Office Action issued in Japanese Patent Application No. 2014-002225.

* cited by examiner

BATTERY PACKS FOR ELECTRIC TOOLS

This application claims priority to Japanese patent application serial number 2014-002225, the contents of which are incorporated herein by reference.

BACKGROUND OF THE INVENTION

Field of the Invention

Embodiments of the present disclosure relate to battery packs for electric tools, which may be detachably mounted to tool main bodies of the electric tools for serving as power sources of the electric tools.

Description of the Related Art

In recent years, battery packs have been used for electric tools and may be detachable mounted to tool main bodies of the electric tools for serving as power sources. In general, a battery pack for an electric tool may include a case serving as an outer casing, and a battery device arranged in the case. The battery device may include a plurality of battery cells capable of charging and discharging, and a circuit board for controlling the charging and discharging operations of the plurality of battery cells. When the charging level of the plurality of battery cells has been reduced, the battery pack may be removed from the tool main body, and may be recharged by a dedicated battery charger. After recharging, the battery pack may be remounted to the tool main body.

The battery pack for an electric tool may generate heat during charging and discharging due to the characteristics of the battery pack as a secondary battery. To this end, a thermistor may be provided in the battery pack for detecting the temperature of the battery cells undergoing charging and discharging (See, for example, Japanese Laid-Open Patent Publication No. 2013-97901). The thermistor may be a linear member. The base end side of the thermistor may be connected to the circuit board. The leading end side of the thermistor may be located between the battery cells arranged in parallel, so that the thermistor is maintained in a state in which it is in contact with the battery cells.

The leading end side of the thermistor may be bonded to the battery cells by using adhesive so that the temperature of the battery cells can be detected in a stable manner. The leading end portion of the thermistor thus bonded to the battery cells can be prevented from being brought out of contact with the battery cells even in the case that the battery cells has moved relative to the circuit board, thus making it possible to detect the temperature of the battery cells in a stable manner.

However, in the case that the leading end portion of the thermistor is bonded to the battery cells by using adhesive as described above, the thermistor may contact the battery cells via the adhesive. This means that the thermistor may indirectly contact the battery cells. Therefore, it may be possible that the thermistor cannot accurately detect the temperature of the battery cells.

Therefore, there has been a need in the art for a technique of enabling a temperature detection device such as a thermistor to accurately detect a temperature of battery cells.

SUMMARY OF THE INVENTION

In one aspect according to the present teachings, a battery pack may include a case, a battery device, an intervening member and a temperature detection device. The battery device may be disposed within the case and may include a cell holder configured to accommodate a plurality of battery cells. The intervening member may be provided between the cell holder and at least one of the plurality of cell holder. The temperature detection device may include a temperature detection element disposed between the intervening member and the at least one of the plurality of cell holder, so that the temperature detection element directly contacts the at least one of the plurality of battery cells for detecting a temperature thereof. At least one of the cell holder and the intervening member may have an elasticity, so that the temperature detection element may be directly pressed against the at least one of the plurality of battery cells due to an elastic deformation of the least one of the cell holder and the intervening member the intervening member.

DETAILED DESCRIPTION OF THE INVENTION

Figure 1:
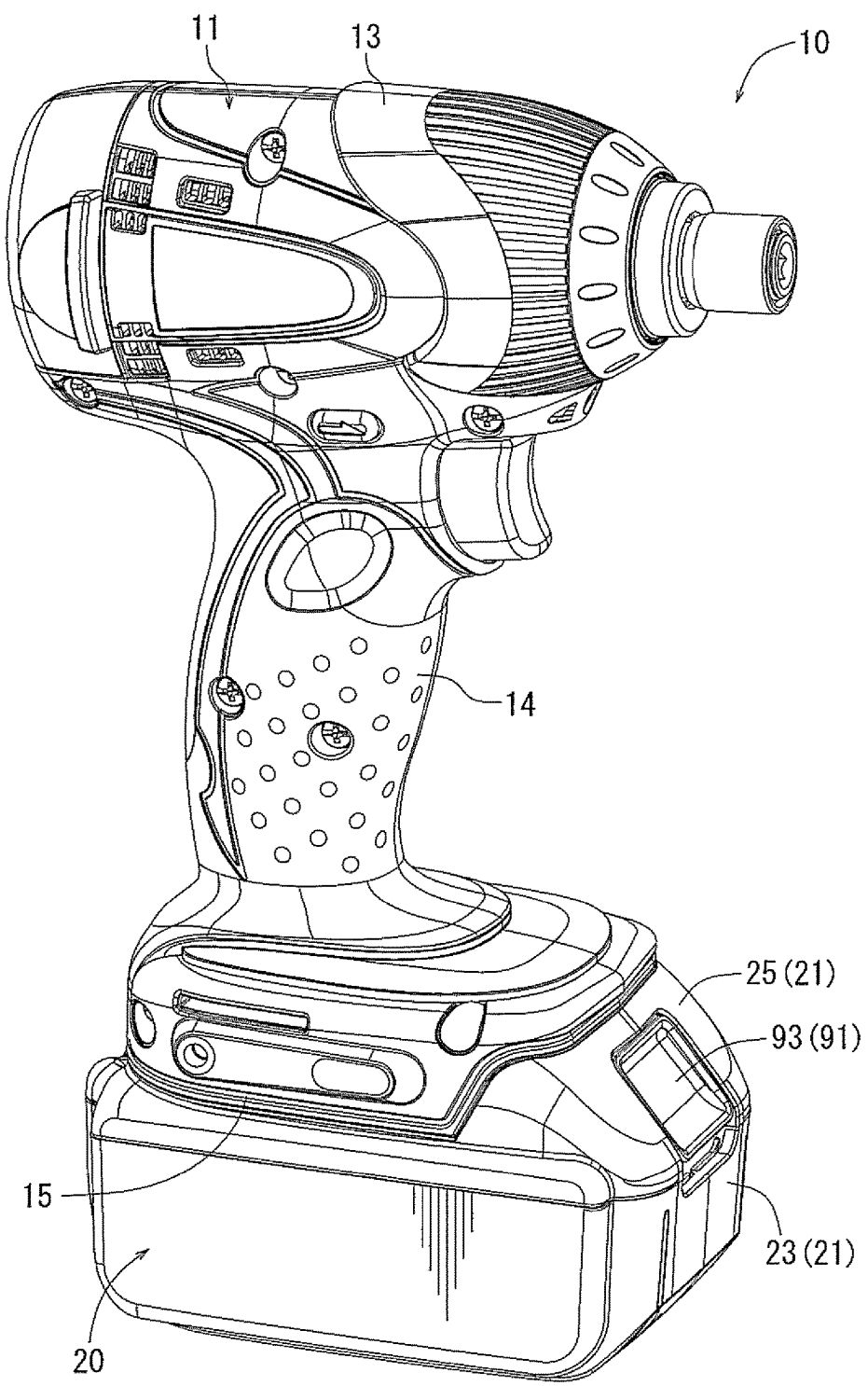
FIG. 1 is an external perspective view of an impact driver to which a battery pack according to a representative embodiment is attached.

In one embodiment, a battery pack may be detachably mounted to a tool main body of an electric tool for serving as a power source. The battery pack may include a case, a battery device, an intervening member and a temperature detection element. The battery device may be disposed within the case and may include a cell holder configured to accommodate a plurality of battery cells that are dischargeable and chargeable. The intervening member and the temperature detection element may be disposed between the cell holder and at least one of the plurality of battery cells and may be arranged in the order of the intervening member and the temperature detection element from the side of the cell holder. The temperature detection element may have an electric resistance that changes depending on a temperature. The temperature detection element may be supported by the cell holder and the intervening member so as to elastically contact with the at least one of the plurality of battery cells.

With this arrangement, it may be possible to ensure that the temperature detection element is held in contact with the at least one battery cell. Therefore, the temperature detection element can accurately detect the temperature of the batter cells.

In order to achieve the elastic contact of temperature detection member, at least one of the cell holder and the intervening member may have elasticity. For example, in the case that the cell holder has elasticity, the cell holder may be formed of an elastic material. In the case that the intervening member has elasticity, the intervening member may have a shape of a sheet or a strip and may have a base member formed of an elastic sheet material. For example, the base material may be chosen from urethane resin, silicon resin, etc. and may have a foam structure like a sponge or may not have a foam structure, such as silicone bond. Naturally, the elastic material forming the cell holder or the intervening member may lose its elasticity during a long time use. However, the elastic material may keep its elasticity during a given service life that may depend of the kind of material used.

The cell holder may include a plurality of cell accommodation portions each configured to accommodate each of the plurality of battery cells and opposing to an outer peripheral surface thereof. The intervening member may be disposed at at least one of the plurality of cell accommodation portions.

The cell holder may include a positioning device configured to position the intervening member relative to the cell holder. With this arrangement, because the intervening member can be positioned relative to the cell holder, the temperature detection element can be also positioned to be suitable for detecting the temperature of the batter cells. Therefore, the accuracy of detecting temperature can be further improved.

The positioning device may include a concave portion configured to allow fitting of at least a part of the intervening member thereinto. In this way, it may be possible to easily position the intervening member relative to the cell holder.

A concave amount of the concave portion may be determined to be smaller than a total thickness of a thickness of the intervening member and a thickness of the temperature detection element when the temperature detection element is laid on the intervening member. In addition, when the plurality of battery cells are accommodated within the cell holder, the total thickness may be reduced to approach the concave amount of the concave portion due to compression of the intervening member in a direction of the thickness. With this arrangement, it may be possible that the temperature detection element is pressed against the at least one of the battery cells with a suitable pressing force that is not too large.

The intervening member may have adhesiveness. In one embodiment, the intervening member may be a double-faced adhesive tape. Therefore, the intervening member can be easily held by the cell holder through adhesion, and the temperature detection element can be easily held by the intervening member through adhesion. Therefore, it may be possible to reliably hold the temperature detection element relative to the cell holder. For example, when the battery pack is vibrating due to the operation of the motor of the electric tool, it may be possible to inhibit movement of the temperature detection element relative to the cell holder.

Figure 2:
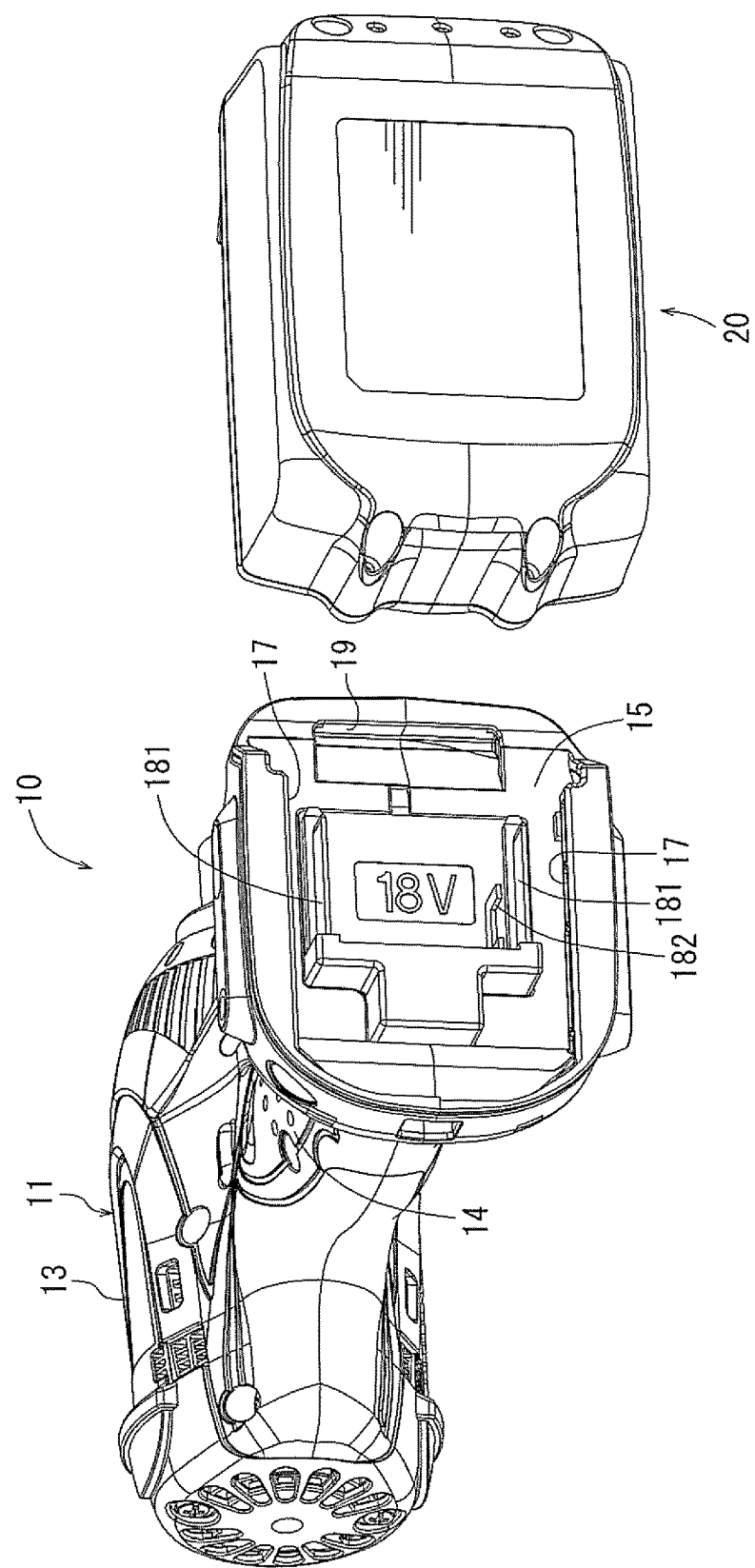
FIG. 2 is an external perspective view of the battery pack as removed from a tool main body of the impact driver shown in FIG. 1.

A representative embodiment of a battery pack for an electric tool will now be described with reference to the drawings. In FIG. 1, reference numeral 10 denotes an impact driver as an example of an electric tool. The impact driver 10 can be driven with a supply of an electric power from a battery pack 20 that can be mounted to a tool main body 11 of the impact driver 10. The battery pack 20 can be detachably mounted to the tool main body 11 of the impact driver 10. That is, if the charge level of the battery pack 20 has been lowered, the battery pack 20 can be removed from the tool main body 11 and attached to a dedicated battery charger for recharging. After recharging by the dedicated battery charger, the battery pack 20 can be mounted to the tool main body 11 again for serving as a power source of the impact driver 10. The tool main body 11 may have a drive portion 13 and a grip portion 14. The tool main body 11 may further include a battery mounting portion 15 that will be described in detail later. FIG. 2 is a perspective view showing the bottom of the tool main body 11, from which the battery pack 20 has been removed. The battery mounting portion 15 is provided on the back side of the lower portion of the tool main body 11. The battery mounting portion 15 may be configured to accommodate the battery pack 20 that is a slide type battery pack in this embodiment. That is, the battery mounting portion 15 is configured to allow the battery pack 20 to be mounted or removed as the battery pack 20 is slid along the battery mount portion 15. More specifically, the battery mounting portion 15 may be provided with a pair of rails 17 that serves to guide the sliding movement of the battery pack 20. The battery mounting portion 15 may further include connection terminals 181 connected through sliding, and a fit-engagement female portion 19 to be fit-engaged with a hook portion 92.

Figure 3:
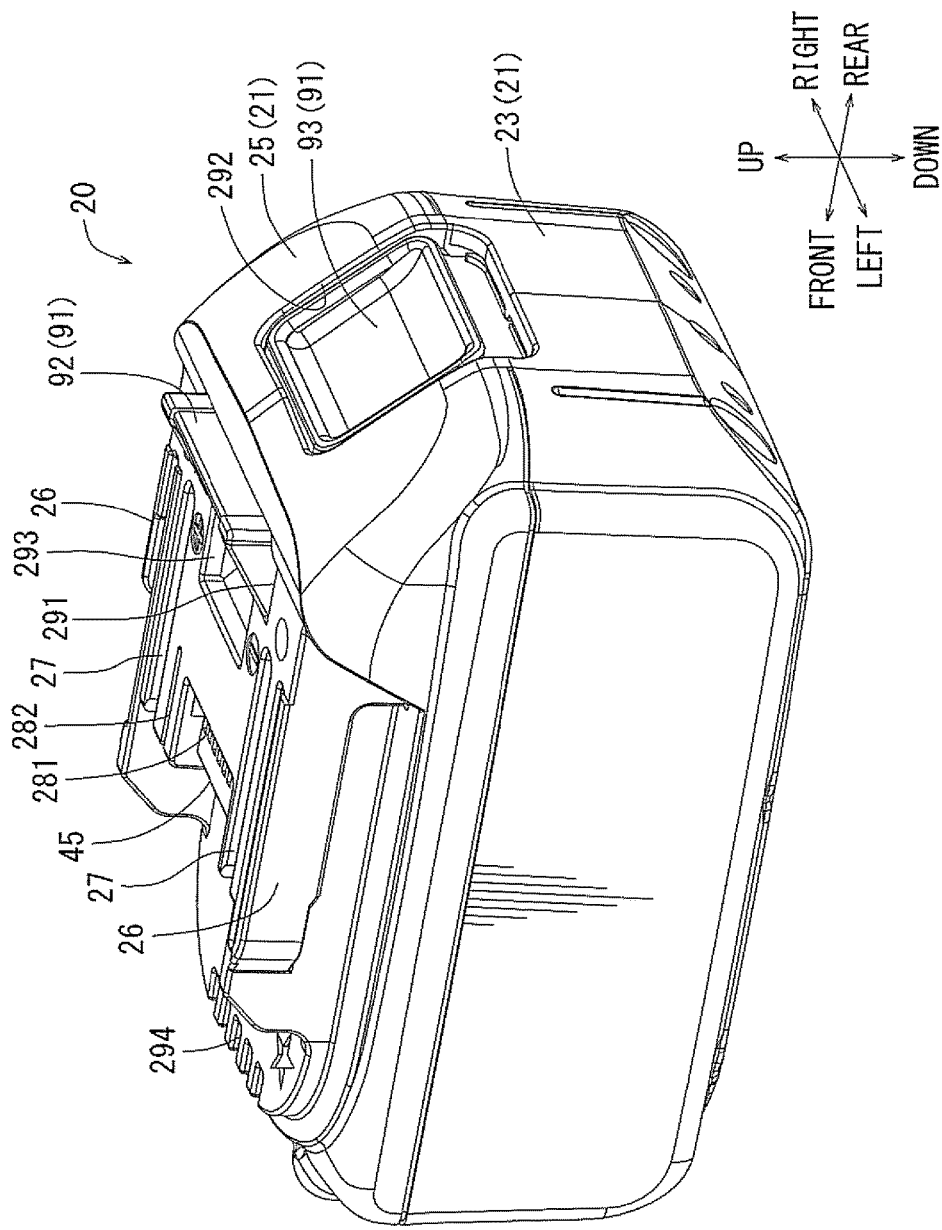
FIG. 3 is an external perspective view of the battery pack.
Figure 4:
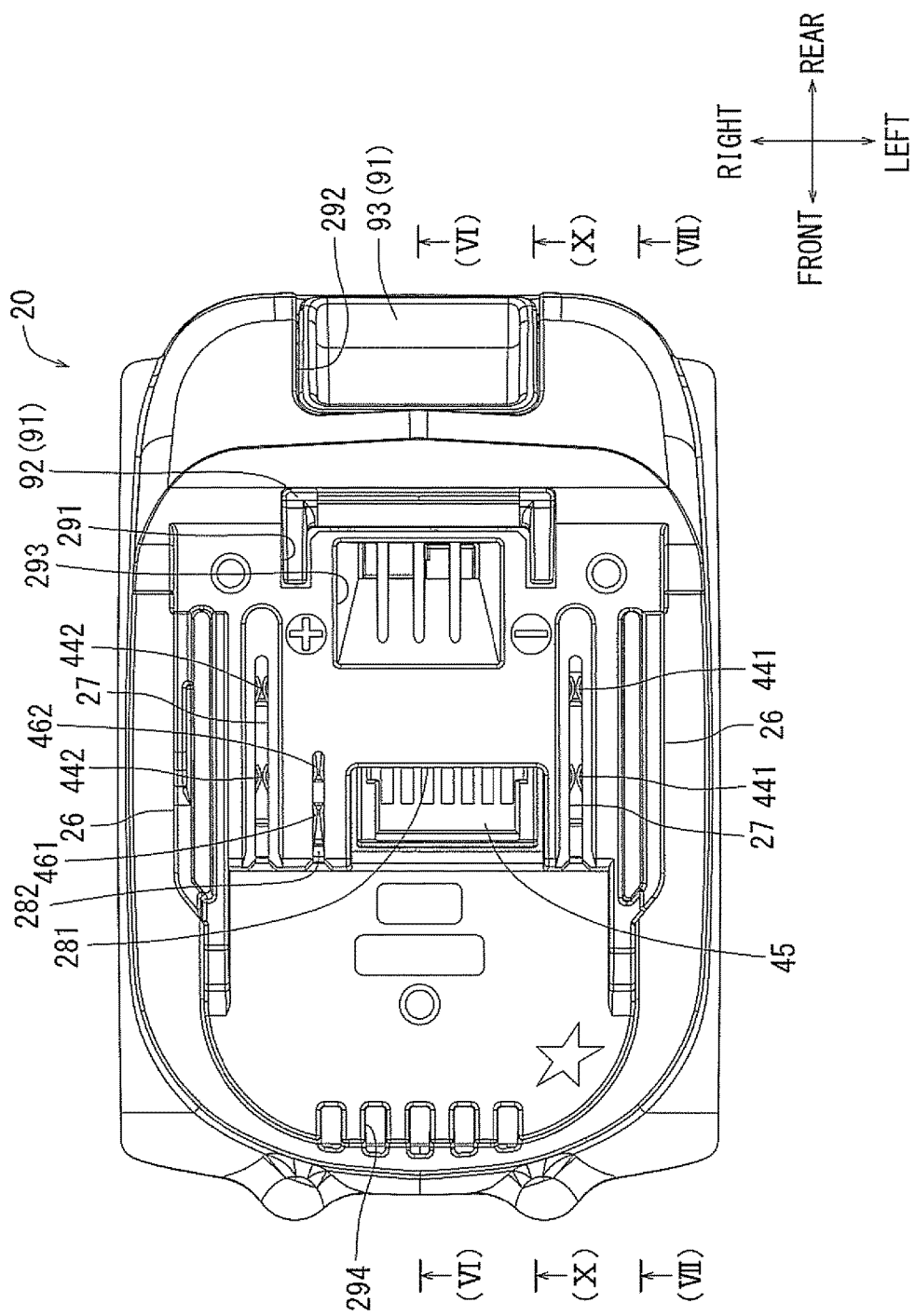
FIG. 4 is a plan view showing the top surface of the battery pack.
Figure 5:
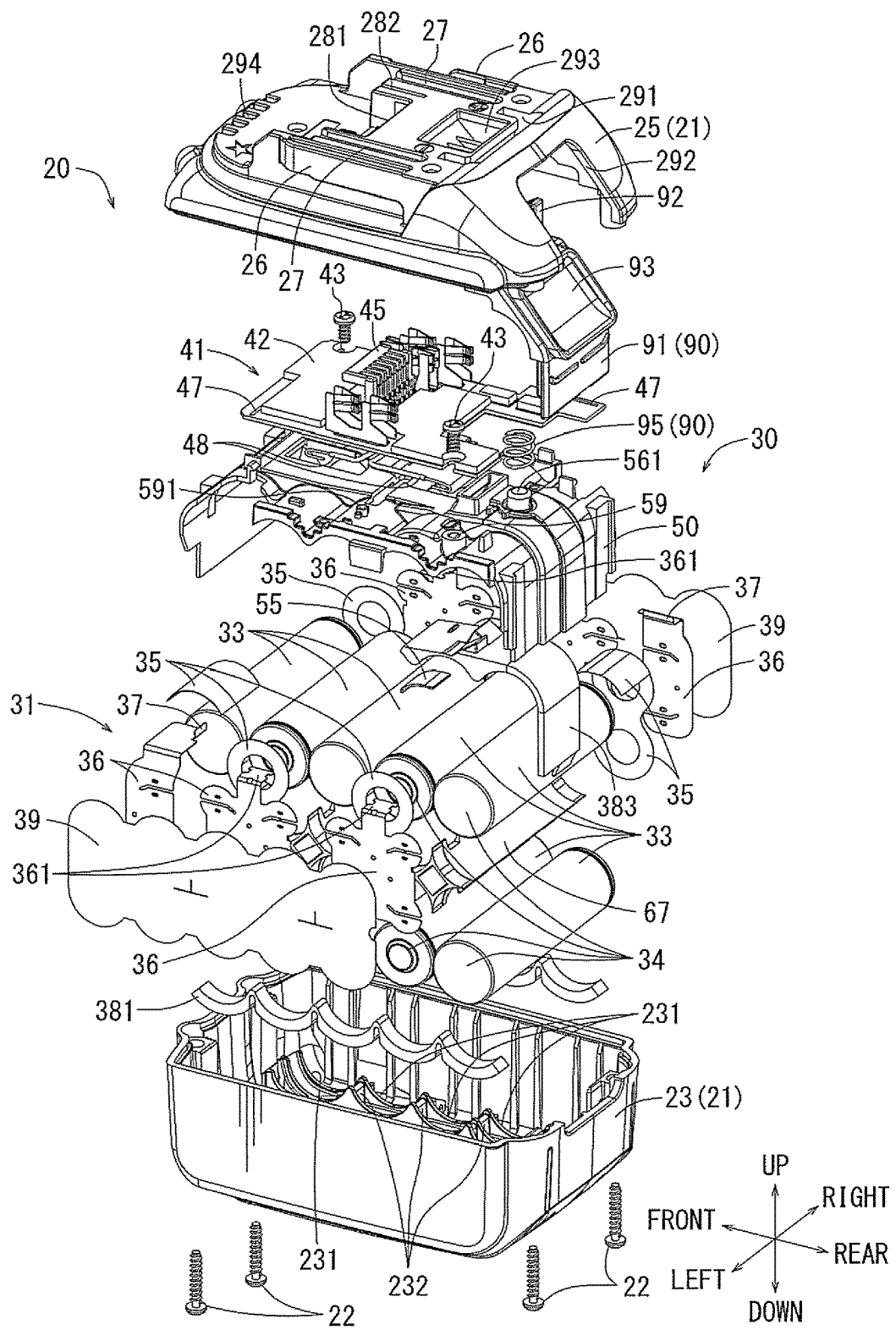
FIG. 5 is an exploded perspective view showing the internal structure of the battery pack.
Figure 6:
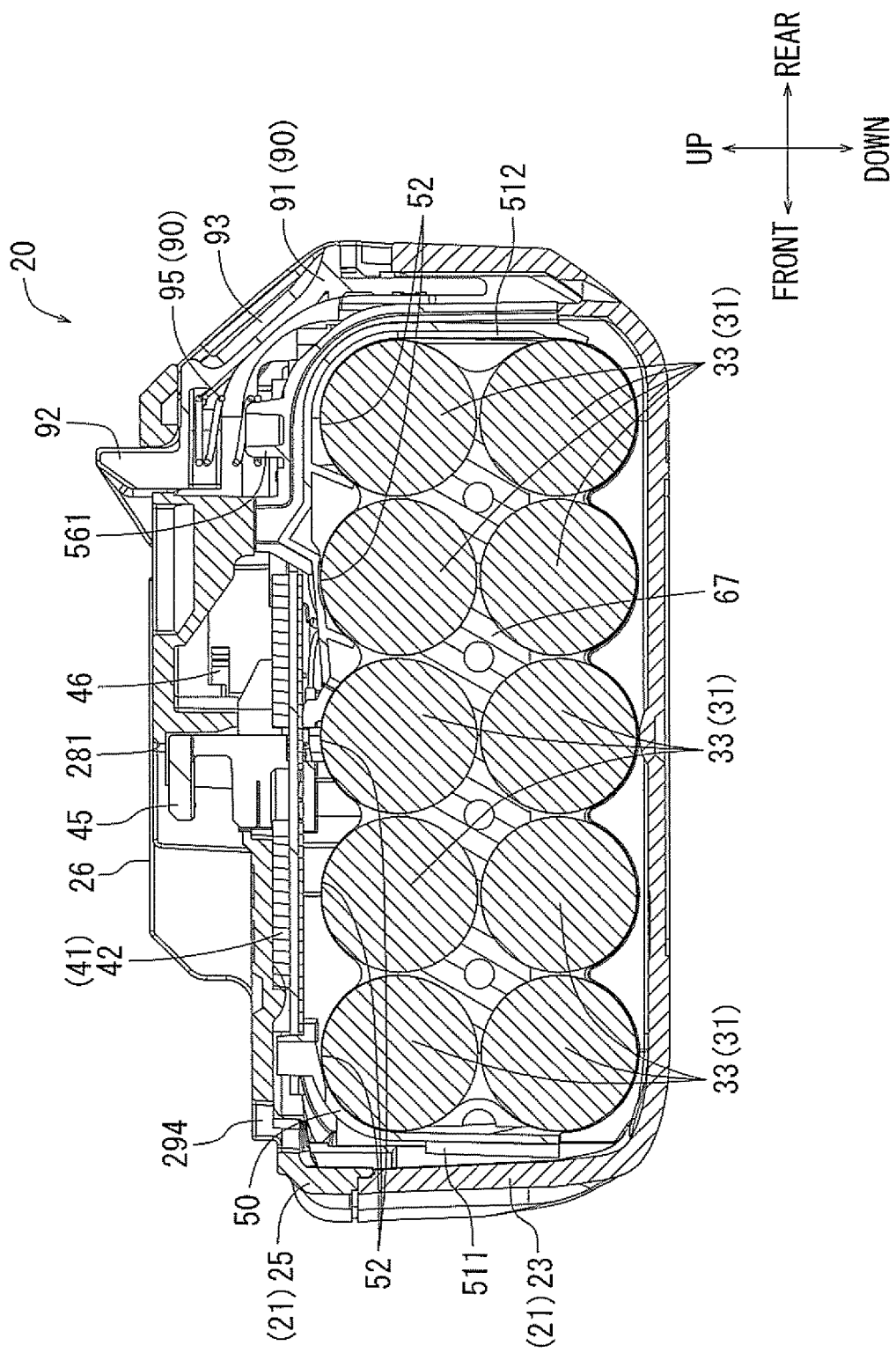
FIG. 6 is a sectional view taken along arrow line (VI)-(VI) in FIG. 4.
Figure 7:
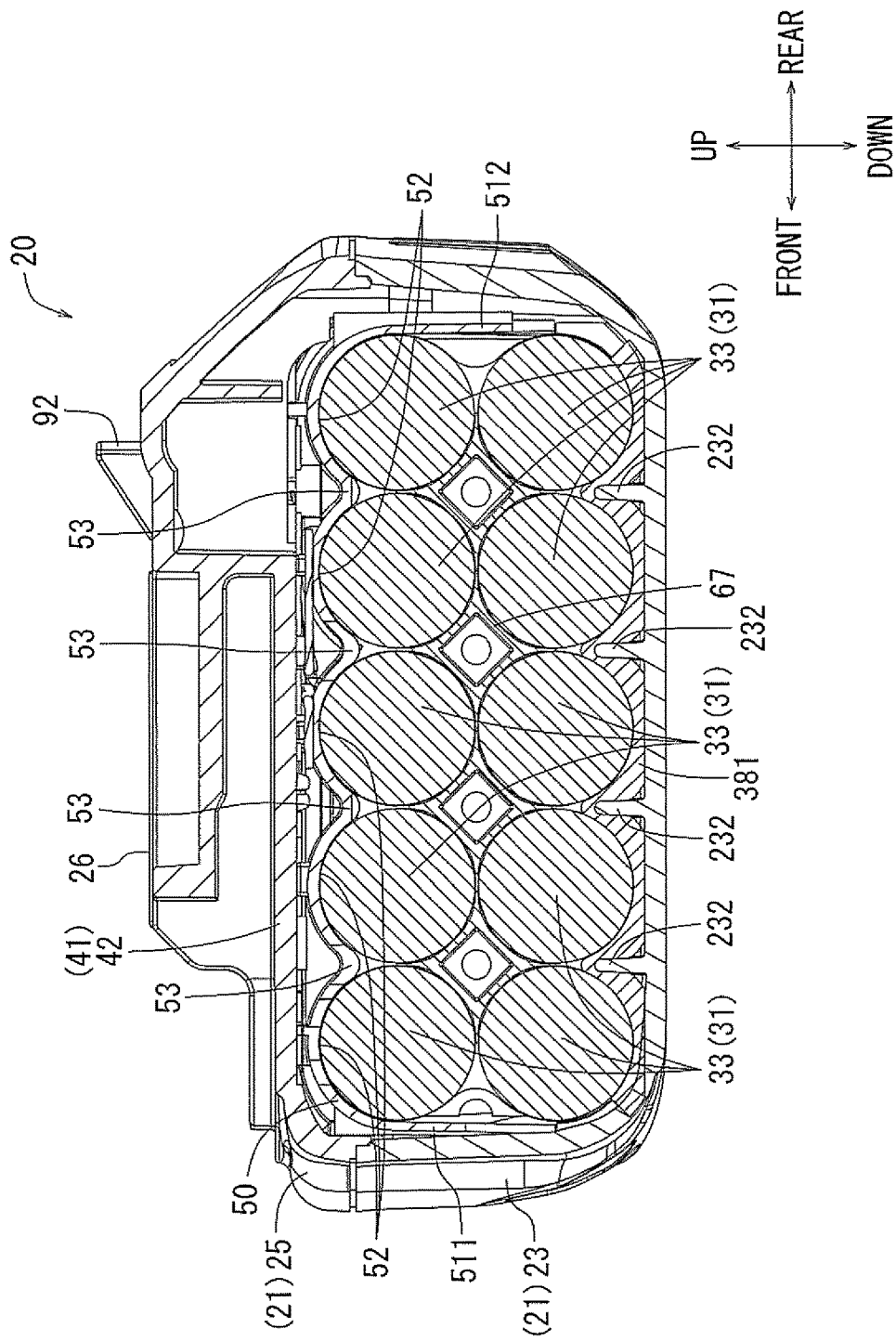
FIG. 7 is a sectional view taken along arrow line (VII)-(VII) in FIG. 4.

Next, the battery pack 20 that can be removably mounted to the battery mounting portion 15 will now be described. FIG. 3 shows an external perspective view of the battery pack 20. FIG. 4 shows a plan view illustrating the top surface of the battery pack 20. FIG. 5 shows an exploded perspective view illustrating the internal structure of the battery pack 20. FIG. 6 is a sectional view taken along arrow line (VI)-(VI) in FIG. 4. FIG. 7 is a sectional view taken along arrow line (VII)-(VII) in FIG. 4. In describing the battery pack 20, its side facing the battery mounting portion 15 when mounted to the battery mounting portion 15 will be referred to as the upper side, and the direction in which the battery pack 20 is slid for mounting to the battery mounting portion 15 will be referred to as the front side. As shown in FIGS. 3 through 5, the battery pack 20 may generally include a case 21, a battery device 30 arranged inside the case 21, and a male hook mechanism 90 for locking the battery pack 20 at a mounted position. The case 21 functions as an enclosure for housing the battery device 30 and for constituting an external casing of the battery pack 20. This case 21 may have a vertically split structure and may include a lower case portion 23 and an upper case portion 25 joined to each other in the vertical direction. The lower case portion 23 and the upper case portion 25 may be maintained in the joined state via fasteners, such as screw members 22 shown in FIG. 3. The case 21 thus formed by joining the lower case portion 23 and the upper case portion 25 may define a space within which the battery device 30 can be received.

As shown in FIGS. 5 through 7, the lower case portion 23 may have a substantially box-like configuration with the upper side open for receiving a battery section 31 of the battery device 30. The battery section will be described later. More specifically, the sizes in front-rear, right-left, and upper-lower directions of the lower case portion 23 may be determined to allow accommodation of battery cells 33 that are ten in total and arranged in two upper and lower stages, each including five battery cells 33 arranged in parallel in the horizontal direction. The battery device 30 may include a circuit board 42. The circuit board 42 may be accommodated inside the upper case portion 25 so as to upwardly protrude from within the lower case portion 23. The upper case portion 25 may serve as a connection side outer casing when the battery pack 20 is mounted through sliding to a main body of an electric device, such as the tool main body 11 of the impact driver 10, or the dedicated battery charger, etc. At the central portion with respect to the front and rear direction of the upper case portion 25, a pair of slide guide portions 26 may be provided for guiding by the rails 17. Thus, the slide mounting of the battery pack 20 to the battery mounting portion 15 of the tool main body 11 may be performed while the pair of slide guide portions 26 are guided by the pair of rails 17. Further, the upper case portion 25 may be provided with slits 27 that may enable electrical connection of connection terminals 181 provided on the battery mounting portion 15 to a ground terminal 441 and a discharge terminal 442 that will be described later. Further, the upper case portion 25 may be provided with an opening 281 and a slit 282 that may enable electrical connection of a communication connector 45, a charging terminal 461, and a communication terminal 462 described blow to a communication terminal and a charging terminal on the dedicated battery charger (not shown) or to a communication terminal 182 of the tool main body 11. Further, the upper case portion 25 may be provided with a hook opening 291 and an operation opening 292 for the male hook mechanism 90. Further, the upper case portion 25 may be provided with ventilation ports 293 and 294 for cooling the battery cells 33 inside the case 21 when the battery pack 20 is mounted to the dedicated battery charger for recharging. As described above, the lower case portion 23 and the upper case portion 25 may be joined together by the screw members 22 to form the case 21.

The male hook mechanism 90 may have a structure that enables detachable engagement with the battery mounting portion 15 when the battery pack 20 is slide-mounted to the battery mounting portion 15. That is, as shown in FIGS. 5 and 6, the male hook mechanism 90 may have a hook-shaped structure 91 and a compression spring 95 urging the hook-shaped structure 91 in a locking direction. The hook-shaped structure 91 may have a hook portion 92 an operation portion 93. The hook portion 92 may be engageable with a fit-engagement female portion 19. The operation portion 93 may have a shape engageable by a finger(s) of the operator. With the male hook mechanism 90 thus constructed, the hook portion 92 can automatically engage the fit-engagement female portion 19 of the battery mounting portion 15 due to the urging force of the compression spring 95. Further, when the operation portion 93 is pulled down against the urging force of the compression spring 95, it is possible to release the fit-engagement of the battery mounting portion 15 with the fit-engagement female portion 19, so that the battery pack 20 can be slid for removing from the apparatus main body. The compression spring 95 may be fitted on a protruding shaft portion 561 protruding from the top surface of a cell holder 50 that will be described later.

Next, the battery device 30 accommodated within the case 21 will be described. As shown in FIG. 5, this battery device 30 may include a control section 41 in addition to the battery section 31. The battery cells 33 of the battery section 31 may be those widely used for allow charging and discharging and may be lithium ion batteries. The battery cells 33 may have cylindrical shapes.

Five battery cells 33 in each of the upper and lower stages may be arranged in parallel in the front and rear direction while their longitudinal axes extend horizontally in the right and left direction. Further, between the upper and lower stages, there may be provided a separator 67. The separator 67 may be configured so as to fill the gaps that may be generated between the ten battery cells 33 arranged in parallel in upper and lower stages. The separator 67 thus formed can maintain a desirable positional relationship between the ten battery cells 33 arranged in parallel in upper and lower stages. Electrodes 34 of each of the battery cells 33 may be positioned at right and left ends thereof, while the battery cells 33 are retained by the separator 67 and the cell holder 50 that will be described later. An insulation sheet 35 may be attached to one end having a positive electrode of the electrodes 34 of each of the battery cells 33 for avoiding unnecessary conduction. Lead plates 36 may be attached to the electrodes 34 of the battery cells 33 for connecting the electrodes 34 of the same potential. The lead plates 36 may include a front left lead plate and a rear right lead plate that are provided with connection end portions 37 for connection to the circuit board 42. Further, insulation sheets 39 may be attached to the outer surfaces of the lead plates 36 for avoiding unnecessary conduction.

The control section 41 may be arranged above the battery cells 33 (battery section 31). The circuit board 42 of the control section 31 may be configured to perform various control operations. More specifically, the circuit board 42 may include a microprocessor mounted thereon. The microcomputer may monitor the condition of the battery cells 33 via the lead plate 36 in order to perform a control related to charging and discharging operations. Therefore, upper end portions 361 of the lead plates 36 may be electrically connected to the circuit board 42 via lead wires 48. A ground terminal 441, a discharge terminal 442, a communication connector 45, a charging terminal 461, and a communication terminal 462 may be mounted to the upper surface of the circuit board 42. The ground terminal 441, the discharge terminal 442, the communication connector 45, the charging terminal 461, and the communication terminal 462 may serve as terminals that are electrically connected to the tool main body 11 (battery mounting portion 15) or the dedicated battery charger. Signals may be transmitted and received via the communication connector 45 and the communication terminal 462 for performing a control process by the circuit board 42. The control process may be performed by the circuit board 42 based on various information that may include temperature information transmitted from a thermistor 70 that will be described later. The circuit board 42 is may be integrated with the cell holder 50 by using screw members 43. The screw members 43 may be threadably engaged with female thread members 59 provided on the cell holder 50 so as to fix the circuit board 42 to the cell holder 50.

Referring to FIGS. 5 and 7, reference numeral 381 denotes a shock absorbing sheet that may be laid over the inner bottom surface of the lower case portion 23 in order to accommodate the battery cells 33 within the case 21. The shock absorbing sheet 381 may be formed, for example, of foam resin exhibiting elasticity. The shock absorbing sheet 381 may be retained by retention arcuate ribs 231 provided in a pair at the inner bottom surface of the lower case portion 23 and arranged opposite each other. Further, between the retention arcuate ribs 31, there may be provided separation ribs 232 each separating two adjacent battery cells 33 from each other in front and rear direction. Each of the retention arcuate ribs 231 may be formed so as to have an inner peripheral side shape substantially conforming to the outer peripheral shapes of the battery cells 33. Thus, the inner peripheral side shape of each of the retention arcuate ribs 231 may have a plurality of semicircular arcs arranged in series to substantially conform to the outer peripheral shapes of the battery cells 33. More specifically, the diameter of the semicircular arcs of the retention arcuate ribs 231 may be determined to be larger than the diameter of the outer peripheral shapes of the battery cells 33 by a given value and the height of the retention arcuate ribs 231 is determined to be smaller than the diameter of the outer peripheral shapes (i.e., the outer diameter) of the battery cells 33 by a given value, so that the accommodation width (front-rear width) of the retention arcuate ribs 231 is increased. As described above, the shock absorbing sheet 381 may be replaced with another one in accordance with the outer diameter of the ten battery cells accommodated. The retention arcuate ribs 231 may allow accommodation of the ten battery cells 33 even in the case that the ten battery cells 33 are those having a maximum outer diameter for use with the battery pack 20.

For example, if the ten battery cells 33 to be accommodated are those having a relatively large outer diameter, the shock absorbing sheet 381 for mounting to the retention arcuate ribs 231 may be that having a relatively small thickness. On the other hand, if the ten battery cells 33 to be accommodated are those having a relatively small outer diameter, the shock absorbing sheet 381 for mounting to the retention arcuate ribs 231 may be that having a relatively large thickness. This shock absorbing sheet 381 may serve to resiliently press the battery cells 33 against the cell holder 50 located above. Like the shock absorbing sheet 381, the separator 67 may also be replaced with another one. In this way, the design of the shock absorbing sheet 381 can be chosen according to the outer diameter of the battery cell 33 to be accommodated. Therefore, it is possible to accommodate the battery cells 33 having various different outer diameters due to the difference in discharge capacitance, manufacturer, etc. As a result, it is possible to improve the versatility of the battery pack 20 and the compatibility of the components of the case 21. Reference numeral 383 denotes a flow control plate that may be provided between the battery cells 33 and the cell holder 50. Reference numeral 55 denotes a double-faced adhesive tape described in detail below.

Figure 8:
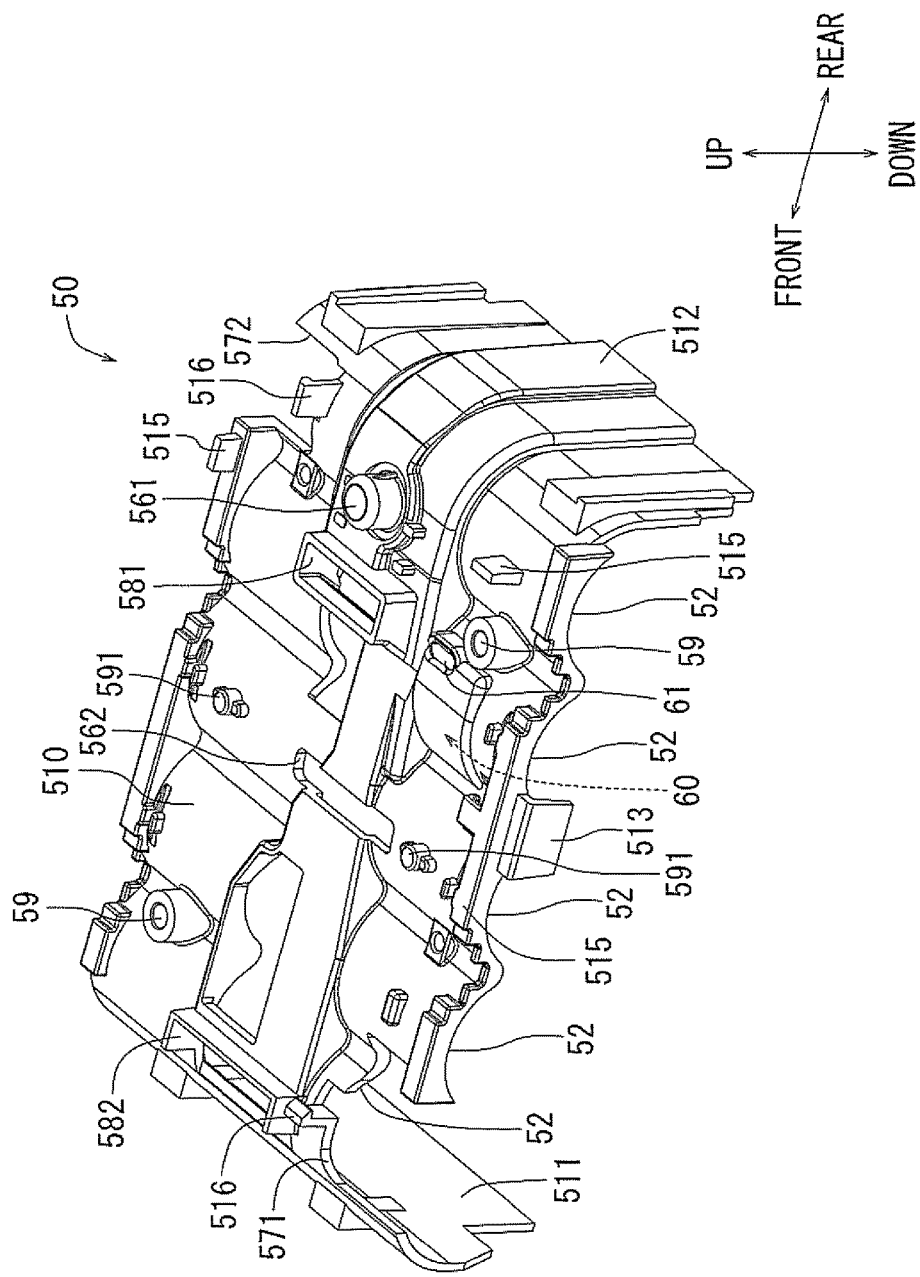
FIG. 8 is a perspective view, as seen from above, of a cell holder of the battery pack.
Figure 9:
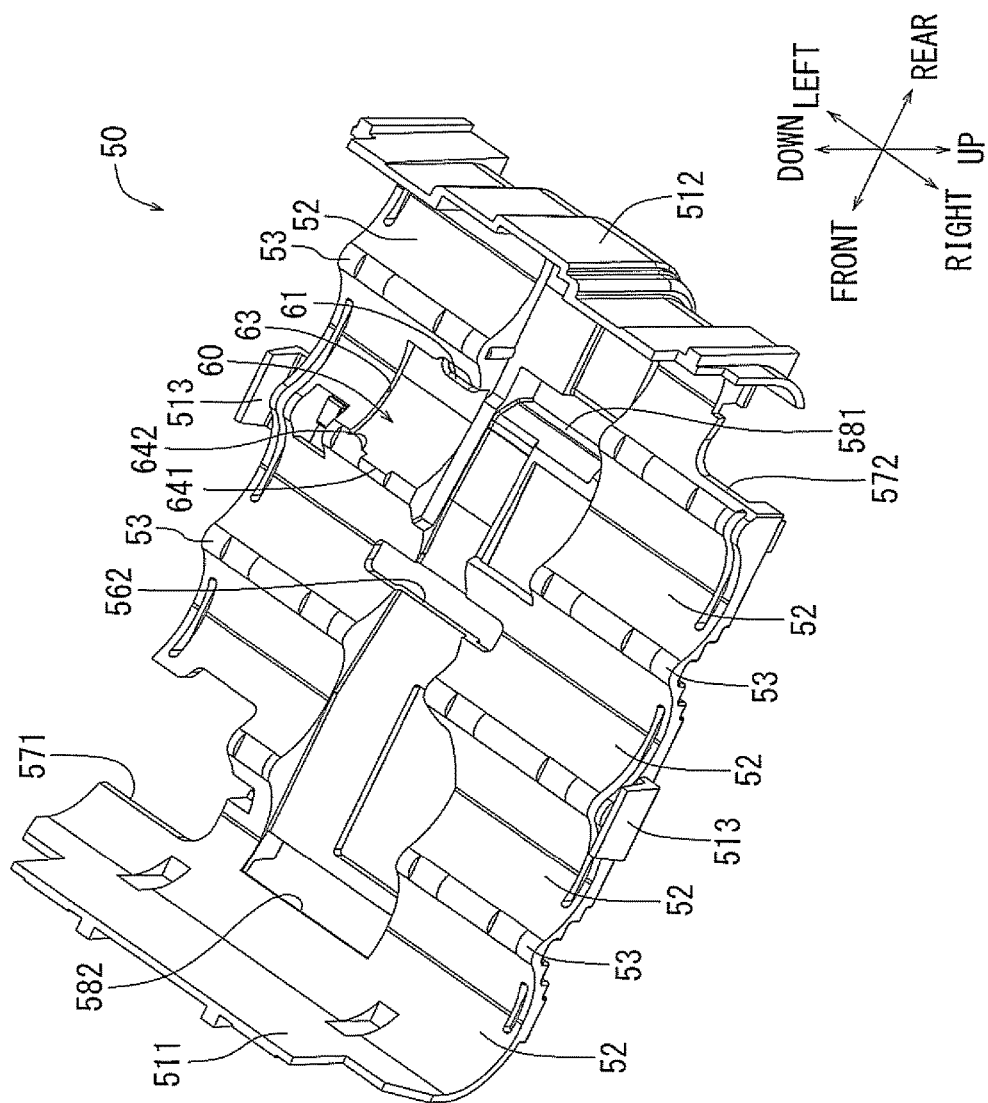
FIG. 9 is a perspective view, as seen from the bottom, of the cell holder.
Figure 10:
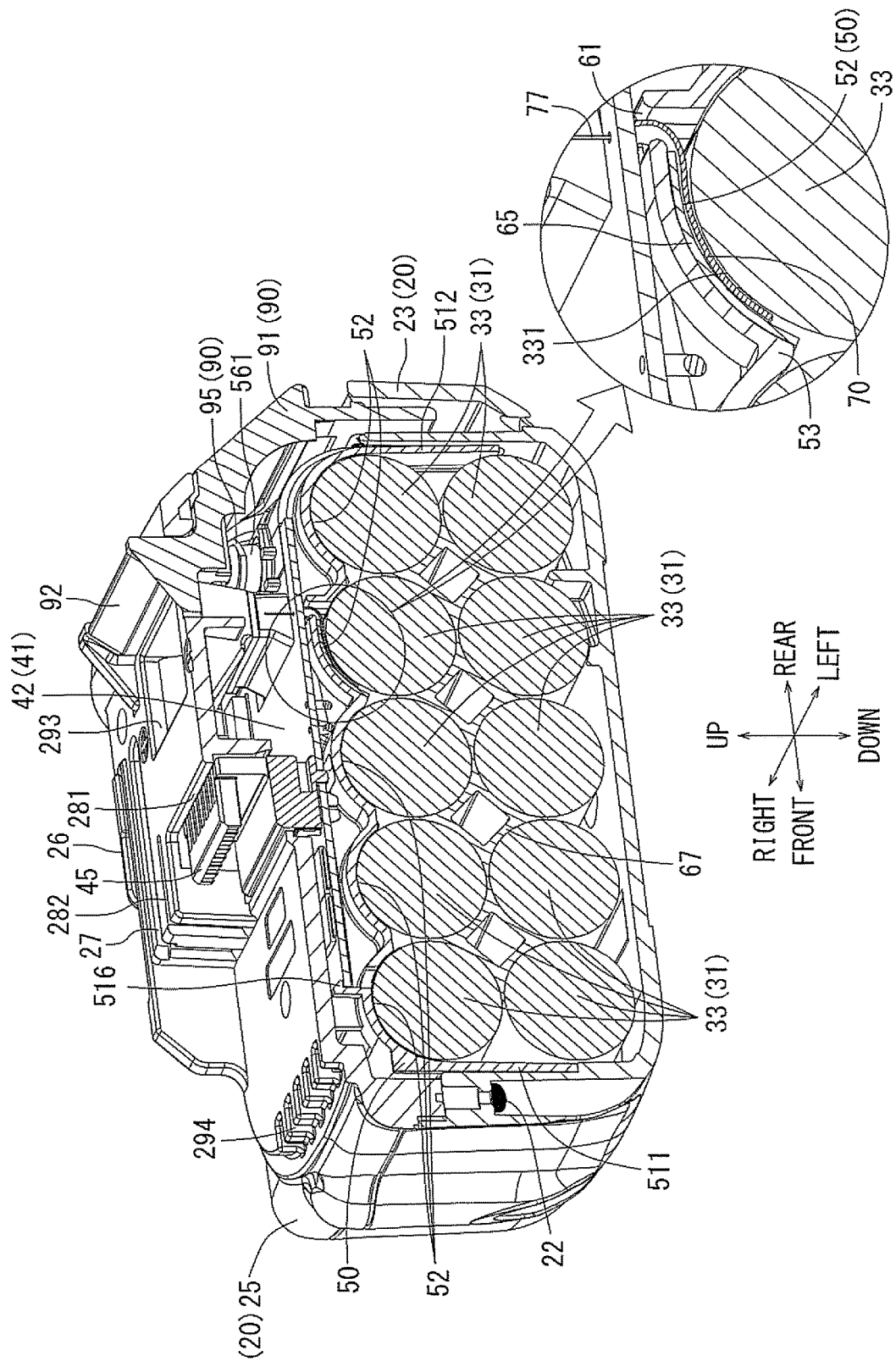
FIG. 10 is a sectional perspective view taken along arrow line (X)-(X) in FIG. 4.
Figure 11:
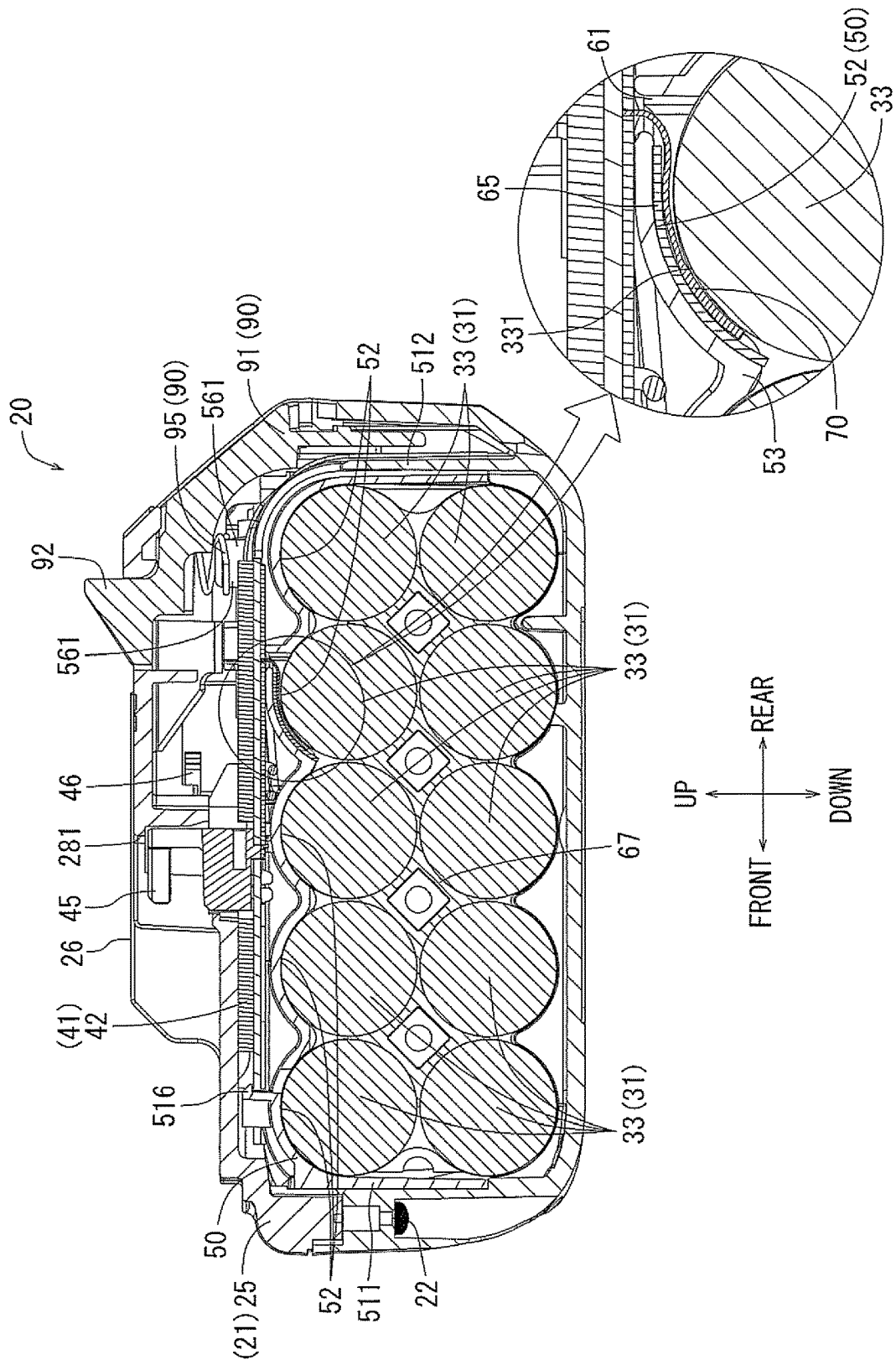
FIG. 11 is a sectional front view taken along arrow line (X)-(X) in FIG. 4.
Figure 12:
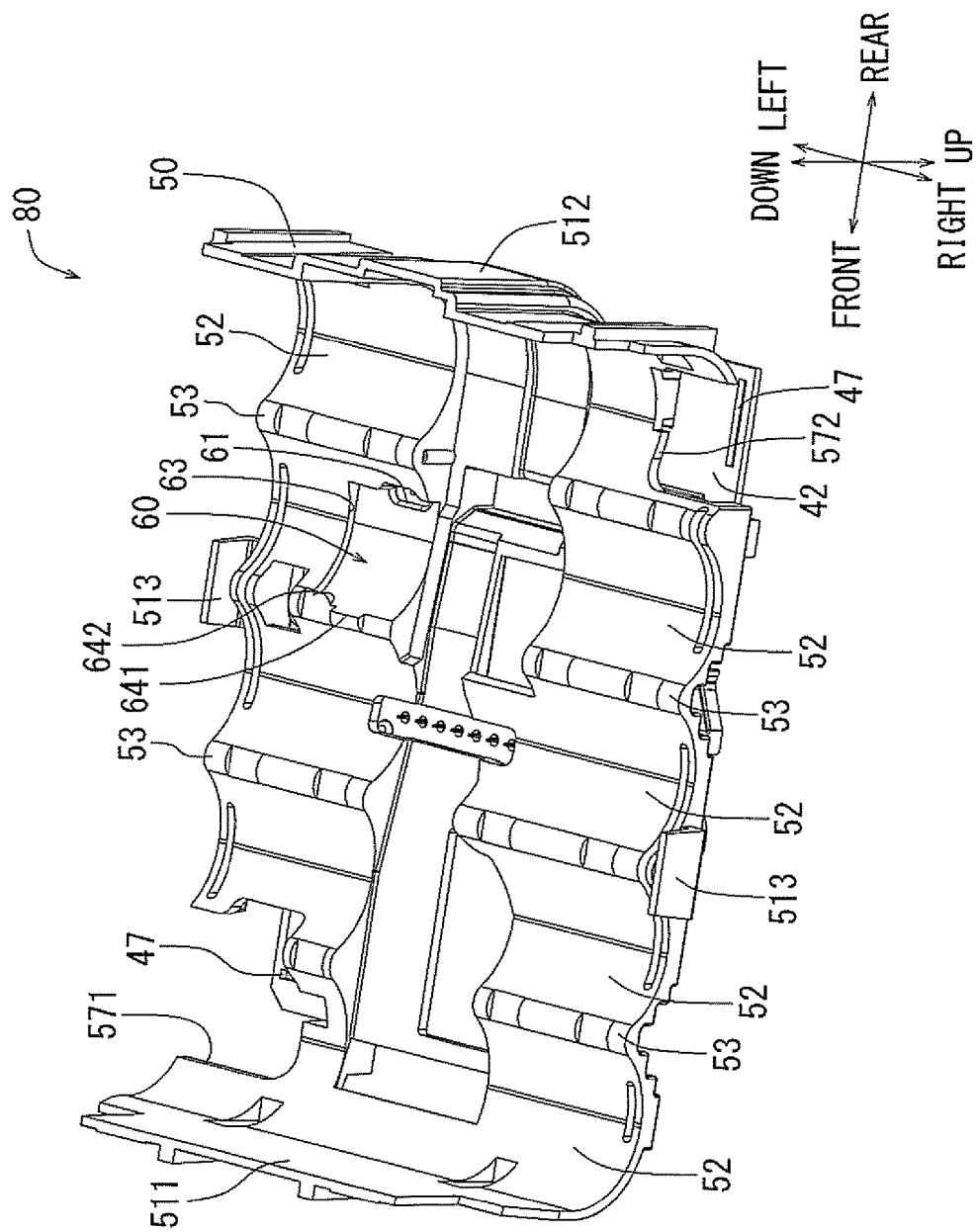
FIG. 12 is a perspective view, as viewed from the bottom side, of a board assembly of the battery pack.
Figure 13:
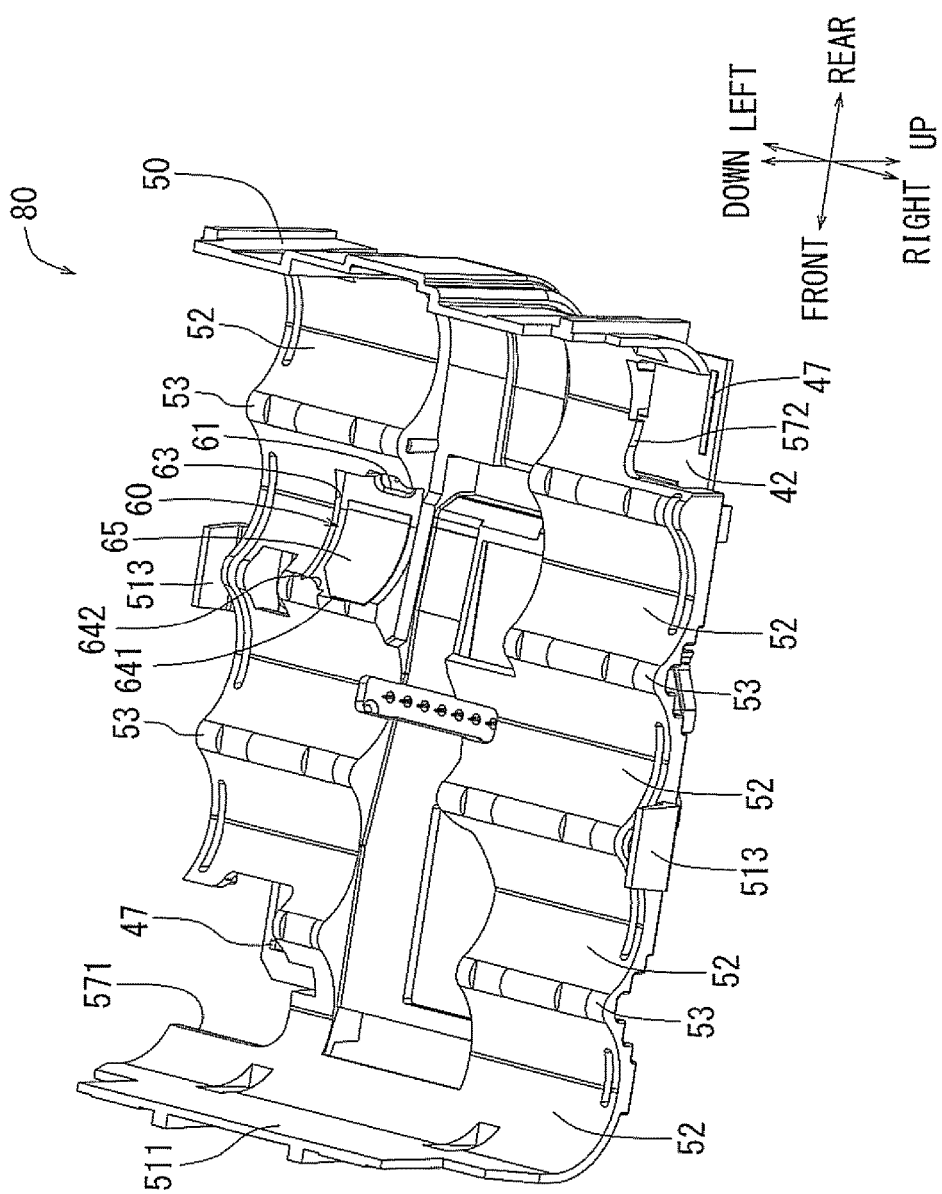
FIG. 13 is another perspective view, as viewed from the bottom side, of the board assembly.
Figure 14:
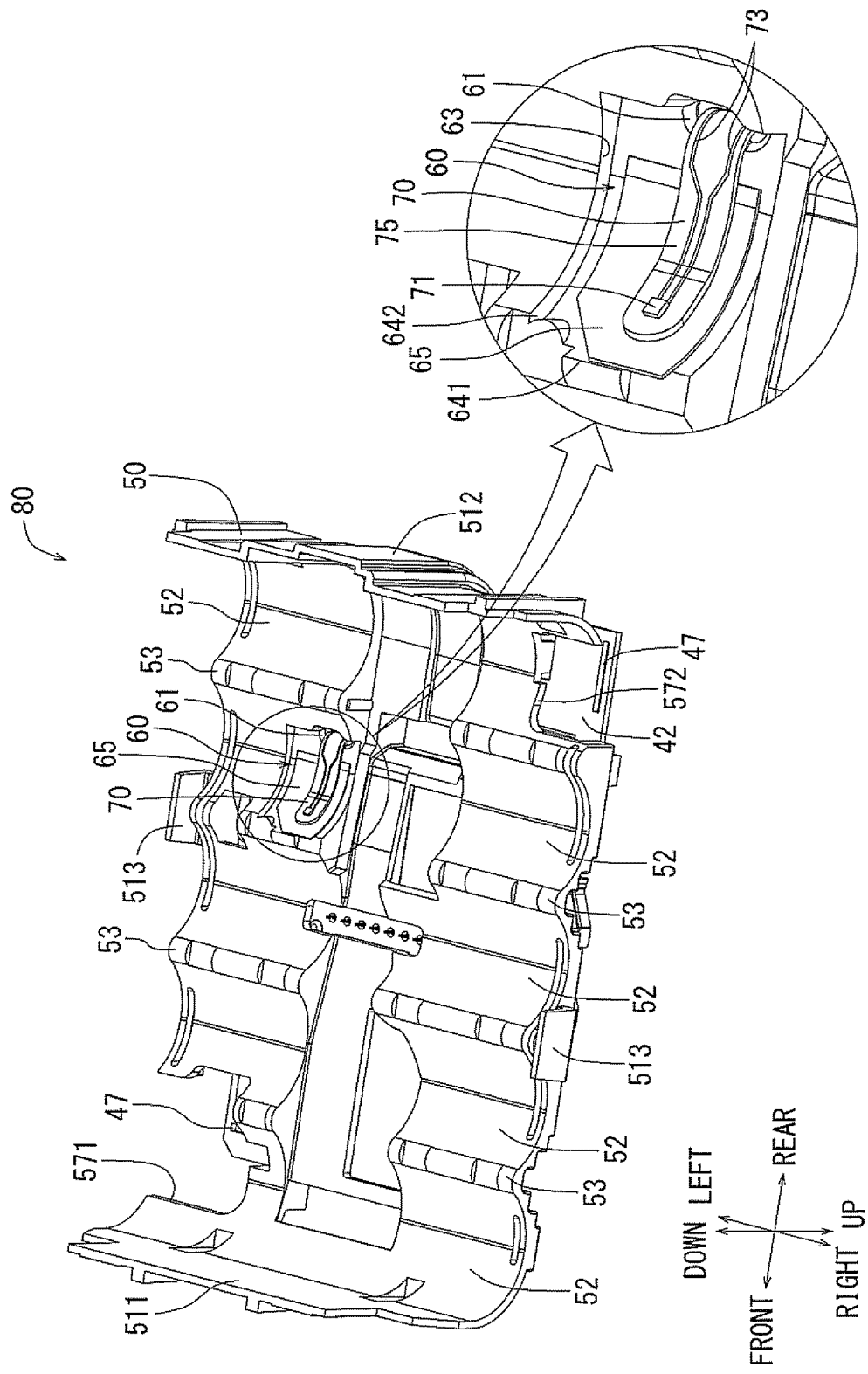
FIG. 14 is a further perspective view, as viewed from the bottom side, of the board assembly.

The circuit board 42 and the cell holder 50 may be assembled with each other to form a board assembly 80. FIG. 8 shows a perspective view, as seen from above, of the cell holder 50. FIG. 9 shows a perspective view, as seen from blow, of the cell holder 50. FIG. 10 is a perspective sectional view taken along arrow line (X)-(X) in FIG. 4. FIG. 11 is a front sectional view taken along arrow line (X)-(X) in FIG. 4. The encircled enlarged portions of FIGS. 10 and 11 show the region where the thermistor 70 is arranged. FIGS. 12 through 14 sequentially illustrate the process steps of attaching the thermistor 70. That is, FIG. 12 is a first perspective view, as seen from below, of the board assembly 80. FIG. 13 is a second perspective view, as seen from below, of the board assembly 80. FIG. 14 is a third perspective view, as seen from below, of the board assembly 80.

The cell holder 50 may accommodate the ten battery cells 33 on its lower side. The circuit board 42 may be fastened to the upper side of the cell holder 50 via the screw members 43. That is, as shown in FIGS. 8 and 9, the cell holder 50 may be formed as a case that is opened on the lower side and also opened on the right and left sides. The cell holder 50 may be provided with an accommodation structure for accommodation of the battery cells 33 on the lower side, a communication structure for communication with the battery cells 33 accommodated on the lower side, and a fixation structure for fixedly retaining the circuit board 42 on the upper side while enabling accommodation within the case 21.

More specifically, the cell holder 50 may include an upper wall portion 510 on the upper side, a front wall portion 511 on the front side, and a rear wall portion 512 on the rear side, which are connected in series with each other. The upper wall portion 510 may be formed so as to define a plurality of cell accommodation portions 52 each capable of accommodating the battery cell 33 on its lower side. Each of the cell accommodation portions 52 may have a curved surface configuration facing an outer peripheral surface 331 (See the encircled portion in FIG. 10) of the battery cell 33. More specifically, each of the cell accommodation portions 52 may be formed so as to have a circular arc-shaped concave surface conforming to the circular arc-shaped convex surface configuration of the outer peripheral surface 331 of the battery cell 33. In other words, the upper wall portion 510 may serve as a partition provided between the cell accommodation portions 52 on the lower side thereof and the circuit board 42 on the upper side thereof. The front wall portion 511 may extend downwardly from the front end edge of the upper wall portion 510. The front wall portion 511 may serve as a partition provided between the cell accommodation portions 52 of the upper wall portion 510 and the lower case portion 23. The rear wall portion 512 may also extend downwardly from the rear end edge of the upper wall portion 510. The rear wall portion 512 may serve as a partition provided between the cell accommodation portions 52 of the upper wall portion 510 and the lower case portion 23.

Forming each of the cell accommodation portions 52 to conform to the outer configuration of the battery cell 33 may provide the accommodation structure of the cell holder 50 for accommodating the battery cells 33 on the lower side. The cell accommodation portion 52 may be configured to allow the battery cells 33 arranged in the horizontal direction while the longitudinal axes of the battery cells extending in the left and right direction. In order that the five battery cells 33 arranged in parallel in the front and rear direction can be accommodated, there may be provided five cell accommodation portions 52 arranged in parallel in the front and rear direction. Therefore, between the cell accommodation portions 52 arranged in parallel in the front and rear direction, there may be provided four chevron-shaped linear protrusions 53. Each of the linear protrusions 53 may extend in the left and right direction so that the cell accommodation portions 52 may be provided on both the front and rear sides thereof.

The communication structure of the cell holder 50 for allowing communication with the battery cells 33 accommodated in the cell accommodation portions 52 may include openings opening formed in the upper wall portion 510 for communication in the vertical direction. More specifically, reference numerals 571 and 572 denote communication openings for allowing electrical connection of the connection end portions 37 of the lead plates 36 to connection portions 47 of the circuit board 42. The communication openings 571 and 572 may be provided by cutting out portions of the cell holder 50 as appropriate in correspondence with the connection end portions 37 of the lead plates 36. Reference numerals 581 and 582 denote ventilation openings for cooling the battery cells 33 inside the case 21. The ventilation openings 581 and 582 are provided in correspondence with ventilation ports 293 and 294 provided in the upper case portion 25. Reference numeral 562 denotes an exposure opening for allowing exposure of a communication connector 45 mounted to the circuit board 42.

The fixation structure for fixedly retaining the circuit board 42 on the upper side may include positioning protrusions 591, positioning ribs 515, and engaging hooks 516. Two positioning protrusions 591 may be provided so as to be arranged in parallel in the left and right direction, and may protrude upwardly. The two positioning protrusions 591 may be fitted into the circuit board 42 at positions proximal to oppose sides of the communication connector 45, so that the circuit board 42 can be positioned with respect to the cell holder 50. The positioning ribs 515 may upwardly protrude at appropriate positions proximal to the outer periphery of the upper surface of the upper wall portion 510. The positioning rib 515 thus protruded may abut the outer peripheral end edge of the circuit board 42 so as to position the circuit board 42 with respect to the cell holder 50 also in this respect. The engaging hooks 516 may be formed to engage the circuit board 42 so as to engage the circuit board 42 with the cell holder 50. Further, on the upper surface of the upper wall portion 510, there may be provided two female thread portions 59 for fixing the circuit board 42 by the screw members 43. More specifically, the female thread portions 59 may be formed so as to be capable of being threadably engaged with the screw members 43 for fixing the circuit board 42 against the upper wall portion 510. Reference numeral 513 denotes right and left guide support portions for enabling that the cell holder 50 with the circuit board 42 fixed thereto is accommodated within the lower case portion 23 without substantial play. The right and left guide support portions 513 may downwardly protrude from the right and left side end edges of the upper wall portion 510 and may slidably contact with the right and left inner peripheral surfaces of the lower case portion 23.

A tape attaching portion 60 for attaching a double-sided adhesion tape 65 may be provided on the lower side (bottom side) of the cell holder 50. This tape attaching portion 60 may be formed at one of the above-mentioned cell accommodation portions 52 each configured to have a circular-arc shaped concave surface. More specifically, the tape attaching portion 60 may be positioned at the second one from the rear side of the five cell accommodation portions 52 arranged in parallel in the front and rear direction. A part of the cell accommodation portion 52 where the tape attaching portion 60 is positioned may be concaved as compared with the remaining portion of the cell accommodation portion 52. More specifically, a stepped portion 63 may be formed on the cell accommodation portion 512 where the tape attaching portion 60 is formed to provide a concave portion, i.e., a bottomed recess. That is, due to the step portion 63, the tape attaching portion 60 may be defined as a concaved portion of the cell accommodation portion 52, so that the cell accommodation portion 52 having the tape attaching portion 60 can be distinguished from the other cell accommodation portions 52 having no tape attaching portion 60. Therefore, the step portion 63 thus defined can be visually checked from the outside, and also functions as a positioning portion that may help to determine the position of the double-sided adhesion tape 65 to be attached to the cell holder 50. Reference numerals 641 and 642 denote elements or portions that may also serve as positioning portions. That is, the reference numeral 641 denotes a positioning cutout portion, i.e., a positioning slot, allowing positioning when attaching the double-sided adhesion tape 65. The positioning cutout portion 641 may provide a positioning edge to which is one of end edges of the double-sided adhesion tape 65 can be aligned when attaching the double-sided adhesion tape 65 to the tape attaching portion 60. The positioning cutout portion 641 may be formed as a slot by partially cutting out the cell holder 50. Therefore, the user can easily visually recognize the positioning cutout portion 641. The reference numeral 642 denotes a side surface portion of the stepped portion 63 allowing positioning of the double-sided adhesion tape 65 when the double-sided adhesion tape 65 is attached. The side surface portion 642 may serve as a positioning portion for the other one of the end edges of the double-sided adhesion tape 65 when attaching the double-sided adhesion tape 65 to the tape attaching portion 60. The side surface portion 642 is a portion of the step portion 63 connecting the bottom of the concaved tape attaching portion 60 to the remaining portion of the cell accommodation portion 52. In this way, the side surface portion 642 can be provided as the step portion 63 is formed. The side surface portion 642 can be visually recognized through oblique-angle observation of the tape attaching portion 60. Further, at the rear end portion of the tape attaching portion 60, there may be provided a terminal connection hole 61 extending vertically through the cell holder 50. A thermistor terminal 77 of the thermistor 70 may be inserted into the terminal connection hole 61 as will be explained later.

The concaved configuration of the tape attaching portion 60 may allow fitting of the entire double-sided adhesion tape 65. The concaved amount (depth) of the tape attaching portion 60 may be set according to a total thickness of the thickness of the double-sided adhesion tape 65 and the thickness of the thermistor 70 attached thereto. More specifically, the concaved amount of the tape attaching portion 60 may coincide with the step amount (step height) of the step portion 63. However, the step amount of the step portion 63 may be set to be smaller than the total thickness of the thickness of the double-sided adhesion tape 65 and the thickness of the thermistor 70 attached thereto. When the thermistor 70 is attached to the tape attaching portion 60 by the double-sided adhesion tape 65, only a part of the thermistor 70 may slightly protrude toward the battery cell side beyond the surface of the remaining portion of the cell accommodation portion 52. The step amount of the step portion 63 may be larger than the thickness of the double-sided adhesion tape 65. Therefore, when the double-sided adhesion tape 65 is attached to the tape attaching portion 60, the surface of the double-sided adhesion tape 65 facing the battery cells 33 may be slightly recessed than the surface of the remaining portion of the cell accommodation portion 52.

As described above, with the tape attaching portion 60 configured as described above, the double-sided adhesion tape 65 and the thermistor 70 are attached in this order from the side of the cell holder 50 to the side of the battery cells 33.

The double-sided adhesion tape 65 serves as a flat-shaped intervening member and may be made of synthetic resin for exhibiting elasticity if slightly. In order to exhibit adhesion function on both sides, the double-sided adhesion tape 65 may have adhesion property on both sides. That is, like an ordinary double-sided adhesion tape, the double-sided adhesion tape 65 may be formed of an elastic base material into a flat sheet-shape and may have adhesion property on both sides. Thus, due to the elasticity of the base material, the double-sided adhesion tape 65 can be elastically deformed. More specifically, the double-sided adhesion tape 65 may be elastically deformed to reduce its thickness when a compression force is applied in the thickness direction. When the compression force is released, the double-sided adhesion tape 65 may restore its thickness due to elasticity. Further, due to the adhesiveness provided on both sides, the upper surface of the double-sided adhesion tape 65 can be attached to the tape attaching portion 60, and, the other surface, i.e., the lower surface thereof can be attached to the thermistor 70.

The thermistor 70 may be a film type thermistor sensor and may have an electrical resistance that may change depending on the temperature. Thus, the thermistor 70 may be a so-called thin film type thermistor, which is widely used as a thermistor for various electronic apparatuses. More specifically, as shown in FIG. 14, the thermistor 70 may have a temperature detection element 71 and a pair of conductive wires 73 that may constitute the thermistor terminal 77. One end of each of the conductive wires 73 may be electrically connected to the temperature detection element 71. The other end of each of the conductive wires 73 may be electrically connected to the circuit board 42 by way of soldering. The temperature detection element 71 and the pair of conductive wires 73 may be covered with a film material 75. Further, as shown in the encircled portion of FIG. 10, the thermistor terminal 77 constituted by the conductive wires 73 of the thermistor 70 may be passed through the terminal insertion hole 61 provided in the cell holder 50 so as to be electrically connected to the circuit board 42.

As noted above, the electrical resistance of the temperature detection element 71 may change depending on temperature. The change in electrical resistance of the temperature detection element 71 may be transmitted to the circuit board 42 via the pair of conductive wires 73. In other words, the circuit board 42 may measure the change of the electrical resistance. The circuit board 42 may then calculate the temperature of a contact portion of the element 71 based on the electrical resistance measured, and may perform an appropriate control operation. Examples of this appropriate control operation may include transmitting a signal to the tool main body 1 for stopping the discharge operation, and transmitting a signal to the dedicated battery charger (not shown) for stopping the charge operation.

The thermistor 70 thus attached to the double-sided adhesion tape 65 may be elastically supported by the cell holder 50 due to the elasticity of the double-sided adhesion tape 65. Further, the thermistor 70 may be supported by the double-sided adhesion tape 65 attached to the tape attaching portion 60 of the cell holder 50 such that the thermistor 70 may elastically contact one of the battery cells 33. The tape attaching portion 60 to which the double-sided adhesion tape 65 and the thermistor 70 are attached may have a curved surface in conformity with the outer peripheral surface 331 of the battery cell 33. That is, the total thickness of the thickness of the double-sided adhesion tape 65 and the thickness of the thermistor 70 attached thereto may be determined such that the thermistor 70 contacts the outer peripheral surface 331 of one of the battery cells 33 when the battery cells 33 are retained by the cell holder 50. Thus, due to contact of the thermistor 70 with the outer peripheral surface 331 of the battery cell 33, the double-sided adhesion tape 65 may be elastically deformed. Because the double-sided adhesion tape 65 is elastically compressed in the direction of thickness, and the total thickness of the thickness of the double-sided adhesion tape 65 and the thickness of thermistor 70 attached thereto may approach the step amount of the step portion 63. Therefore, the temperature detection element 71 of the thermistor 70 may be positioned so as to extend along a substantially the same plane as the surface of the remaining portion of the cell accommodation portion 52, while the thermistor 70 contacts the outer peripheral surface 331 of the battery cell 33. Due to the elastic restoring force of the double-sided adhesion tape 65, the temperature detection element 71 of the thermistor 70 may be pressed against the outer peripheral surface 331 of the battery cell 33 with a suitable pressing force while it contacts the outer peripheral surface 331 of the battery cell 33. In this way, the double-sided adhesion tape 65 may serve an elastic member elastically supporting the temperature detection element 71 of the thermistor 70 in a suitable manner with respect to the outer peripheral surface 331 of the battery cell 33. In addition, the double-sided adhesion tape 65 may also serve as a shock absorbing member that can mitigate a pressing force that may be applied to the temperature detection element 71 of the thermistor 70 by the outer peripheral surface 331 of the battery cell 33.

With the battery pack 20 described above, the temperature detection element 71 of the thermistor 70 may be supported by the cell holder 50 and the double-sided adhesion tape 65 and may be held in contact with one of the battery cell 33 by the elastic support force of the double-sided adhesion tape 65. As a result, the temperature detection element 71 of the thermistor 70 can be held in position so as to directly contact with the battery cells 33. Thus, it is possible to further enhance the accuracy in the temperature detection by the temperature detection element 71 of the thermistor 70. Further, in the above-described battery pack 20, the double-sided adhesion tape 65 can be attached to have a shape conforming to the circular arc-shaped concave configuration of the cell accommodation portion 52 of the cell holder 50. As a result, it is possible to bring the temperature detection element 71 of the thermistor 70 into direct surface-to-surface contact with the outer peripheral surface 331 of the battery cell 33. Thus, it is possible to improve the accuracy in the temperature detection by the temperature detection element 71 of the thermistor 70. Further, in the above-described battery pack 20, the cell holder 50 is provided with the step portion 63 for positioning of the double-sided adhesion tape 65 with respect to the cell holder 50, so that it is possible to appropriately position the double-sided adhesion tape 65. As a result, it is possible to appropriately position the temperature detection element 71 of the thermistor 70, making it possible to further improve the accuracy in temperature detection. Further, in the above-described battery pack 20, the tape attaching portion 70 may be configured as a concave portion in to which the double-sided adhesion tape 65 can be fitted. In addition, the bottom surface of the concave portion may have a curved concave configuration, so that the double-sided adhesion tape 65 may be deformed to conform to the shape of the bottom surface when it is attached. As a result, the attaching operation of the double-sided adhesion tape 65 may be facilitated. Further, in the above-described battery pack 20, the concaved amount of the tape attaching portion 60 may be set to be smaller than the total thickness of the thickness of the double-sided adhesion tape 65 and the thermistor 70 attached thereto. Therefore, the double-sided adhesion tape 65 can elastically deform to press the temperature detection element 71 of the thermistor 70 against the battery cell 33.

Further, in the above-described battery pack 20, the step portion 63 may have the side surface portion 642 that can be used for positioning the end edge of the double-sided adhesion tape 65. Therefore, the double-sided adhesion tape 65 can be positioned with reference to the side surface portion 642. As a result, the operation of attaching the double-sided adhesion tape 65 can be further facilitated. Further, in the above-described battery pack 20, the total amount of the thickness of the double-sided adhesion tape 65 and the thickness of the thermistor 70 having the temperature detection element 71 and attached thereto may approach to the concaved amount of the tape attaching portion 60 through the compression of the double-sided adhesion tape 65 when the battery cells 33 are accommodated in the cell holder 50. Therefore, the temperature detection element 71 of the thermistor 70 may contact the battery cell 33 in a suitable manner without receiving an excessive pressing force. Further, because the double-sided adhesion tape 65 may exhibit adhesiveness on both sides, it can be easily retained by the cell holder 50 and the temperature detection element 71 of the thermistor 70 can be also easily retained. As a result, the temperature detection element 71 of the thermistor 70 can be reliably held in position with respect to the cell holder 50. For example, when the battery pack 20 is vibrating, the effect of inhibiting movement of the temperature detection element 71 of the thermistor 70 with respect to the cell holder 50 can be achieved.

The above embodiment may be modified in various ways. For example, in the above embodiment, the battery cells are arranged in two upper and lower stages each having five cells arranged in parallel in the front and rear direction, i.e., ten battery cells in total are provided. However, it may be possible to provide an appropriate number of battery cells other than ten. Further, although the elastic support for holding in contact with the battery cells with elasticity is attained by the double-sided adhesion tape 65 in the above embodiment, the contact with elasticity may also be attained by, for example, providing the elasticity to the cell holder 50 itself. Further, as the base material of the double-sided adhesion tape 65 serving as an intervening member, it may be possible to use any kind of resin as long as it has elasticity. Preferably, the intervening member may have a thickness that is enough to cause deformation in the direction of thickness. For example, the base material of the intervening member may be chosen from urethane resin, silicon resin, etc. and may have a foam structure like a sponge or may not have a foam structure, such as silicone bond.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric tools, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A battery pack for detachably mounting to a tool main body of an electric tool for serving as a power source, the battery pack comprising:
    a case;
    a battery device disposed within the case, the battery device including a cell holder configured to accommodate a plurality of battery cells that are dischargeable and chargeable, the cell holder including a plurality of cell accommodation portions, each one of the plurality of cell accommodation portions being contoured to an outer peripheral surface of one of the plurality of battery cells and configured to accommodate one of the plurality of battery cells;
    an intervening member attaching portion recessed in at least one cell accommodation portion and contoured to a shape of the outer peripheral surface of one of the plurality of battery cells; and
    an intervening member and a thermistor disposed between the cell holder and at least one of the plurality of battery cells, the thermistor including a temperature detection element and conductive wires, the intervening member and the thermistor being arranged in an order of the intervening member and the thermistor from a side of the cell holder, the thermistor being attached at a proximal end to the cell holder and having an elongated length contoured to the shape of the outer peripheral surface of one of the plurality of battery cells, the temperature detection element being disposed on a distal end of the thermistor and the conductive wires extending across the contoured elongated length of the thermistor, the proximal end of the thermistor curving away from the outer peripheral surface of the one of the plurality of battery cells and towards the cell holder, wherein:
        the intervening member is entirely disposed along the contoured intervening member attaching portion, and disposed between the intervening member attaching portion and the outer peripheral surface of the battery cell accommodated in the cell accommodation portion; and
        the temperature detection element has an electric resistance that changes depending on a temperature, and the temperature detection element is supported by the cell holder and the intervening member so as to elastically contact with the at least one of the plurality of battery cells.

2. The battery pack according to claim 1, wherein the intervening member is configured to have a shape of a sheet or a strip.

3. The battery pack according to claim 1, wherein the cell holder includes a positioning device configured to position the intervening member relative to the cell holder.

4. The battery pack according to claim 3, wherein the positioning device includes a concave portion configured to allow fitting of at least a part of the intervening member thereinto.

5. The battery pack according to claim 4, wherein:
    a concaved amount of the concave portion is determined to be smaller than a total thickness of a thickness of the intervening member and a thickness of the temperature detection element when the temperature detection element is disposed on the intervening member; and
    when the plurality of battery cells are accommodated within the cell holder, the total thickness is reduced to approach a concaved amount of the concave portion due to compression of the intervening member in a direction of the thickness.

6. The battery pack according to claim 2, wherein the intervening member has adhesiveness.

7. The battery pack according to claim 6, wherein the intervening member is a double-faced adhesive tape.

8. The battery pack according to claim 1, wherein the temperature detection element is a part of a film-type thermistor attached to the intervening member.

9. The battery pack according to claim 4, wherein the positioning device further includes an alignment portion for alignment of at least a part of the intervening member.

10. The battery pack according to claim 9, wherein the alignment portion is one of side surfaces of the concave portion extending in a direction of a depth of the concave portion.

11. The battery pack according to claim 9, wherein the alignment portion is a slot formed in the cell holder proximal to the concave portion.

12. A battery pack comprising:
a case;
a battery device disposed within the case and including a cell holder configured to accommodate a plurality of battery cells, the cell holder including a plurality of cell accommodation portions, each one of the plurality of cell accommodation portions being contoured to an outer peripheral surface of one of the plurality of battery cells and configured to accommodate one of the plurality of battery cells;
an intervening member provided between the cell holder and at least one of the plurality of cells;
an intervening member attaching portion recessed in at least one cell accommodation portion and contoured to the shape of the outer peripheral surface of one of the plurality of battery cells; and
a temperature detection device including a temperature detection element disposed between the intervening member and the at least one of the plurality of cells, such that the temperature detection element directly contacts the at least one of the plurality of battery cells for detecting a temperature thereof, the temperature detection device being attached at a proximal end to the cell holder and having an elongated length contoured to the shape of the outer peripheral surface of one of the plurality of battery cells, the temperature detection element being disposed on a distal end of the temperature detection device and having conductive wires extending across the contoured elongated length of the temperature detection device, the proximal end of the temperature detection device curving away from the outer peripheral surface of the one of the plurality of battery cells and towards the cell holder, wherein:
the intervening member is disposed between the intervening member attaching portion and the outer peripheral surface of a one of the plurality of battery cells to be accommodated in one of the plurality of cell accommodation portions; and
at least one of the cell holder and the intervening member has an elasticity, such that the temperature detection element is directly pressed against the at least one of the plurality of battery cells due to an elastic deformation of the at least one of the cell holder and the intervening member.

13. The battery pack according to claim 12, wherein:
the intervening member has elasticity and is attached to the cell holder; and
the temperature detection device is attached to the intervening member.

14. The battery pack according to claim 13, wherein:
the intervening member is configured to have a shape of a sheet or a strip and has an elasticity in a direction of thickness; and
the temperature detection device is a film-type temperature detection device.

15. The battery pack according to claim 14, wherein the intervening member is a double-faced adhesive tape, and the temperature detection device is a film-type thermistor.

16. The battery pack according to claim 1, wherein each cell accommodation portion is contoured to have a circular-arc shaped concave surface such that each cell accommodation portion is conformed to a circular arc-shape of the outer peripheral surface of the battery cells.

17. The battery pack according to claim 12, wherein each cell accommodation portion is contoured to have a circular-arc shaped concave surface such that each cell accommodation portion is conformed to a circular arc-shape of the outer peripheral surface of the battery cells.

18. The battery pack according to claim 1, wherein the temperature detection element is in direct contact with the at least one of the plurality of battery cells for detecting a temperature thereof.

19. The battery pack according to claim 1, wherein the cell holder further includes a step portion that is formed directly on one of the cell accommodation portions, in which the intervening member attaching portion is formed directly thereon, and the step portion is configured to position the intervening member.

20. The battery pack according to claim 12, wherein the cell holder further includes a step portion that is formed directly on one of the cell accommodation portions, in which the intervening member attaching portion is formed directly thereon, and the step portion is configured to position the intervening member.

21. The battery pack according to claim 1, wherein the conductive wires contour the outer peripheral surface of one of the plurality of battery cells.

22. The battery pack according to claim 1, wherein:
the conductive wires include a pair of wires that extend in parallel from the temperature detection element towards the proximal end of the thermistor at a first distance from each other, and
along the elongated length of the thermistor, the conductive wires separate from the first distance to a second distance from each other and extend in parallel towards the proximal end of the thermistor, the conductive wires curving away from the outer peripheral surface of the one of the plurality of battery cells and towards the cell holder.

* * * * *